United States Patent
Ferger et al.

(10) Patent No.: US 10,523,596 B1
(45) Date of Patent: Dec. 31, 2019

(54) CIRCUITS FOR AND METHODS OF MERGING STREAMS OF DATA TO GENERATE SORTED OUTPUT DATA

(71) Applicant: Xilinx, Inc., San Jose, CA (US)

(72) Inventors: Max Ferger, Bochum (DE); Michaela Blott, Dublin (IE)

(73) Assignee: Xilinx, Inc., San Jose, CA (US)

( * ) Notice: Subject to any disclaimer, the term of this patent is extended or adjusted under 35 U.S.C. 154(b) by 152 days.

(21) Appl. No.: 14/616,587

(22) Filed: Feb. 6, 2015

(51) Int. Cl.
*H04L 12/935* (2013.01)

(52) U.S. Cl.
CPC .................................. *H04L 49/30* (2013.01)

(58) Field of Classification Search
None
See application file for complete search history.

(56) References Cited

U.S. PATENT DOCUMENTS

| | | | | |
|---|---|---|---|---|
| 4,628,483 A * | 12/1986 | Nelson | ...................... | G06F 7/24 |
| 4,891,803 A * | 1/1990 | Huang | ................ | H04L 12/5601 |
| | | | | 370/411 |
| 4,899,335 A * | 2/1990 | Johnson, Jr. | ........ | H04L 49/1507 |
| | | | | 370/392 |
| 5,265,260 A * | 11/1993 | Hendricks | ................. | G06F 7/24 |
| 5,349,684 A * | 9/1994 | Edem | ........................ | G06F 7/36 |
| 5,386,583 A * | 1/1995 | Hendricks | ................. | G06F 7/24 |
| 5,511,189 A * | 4/1996 | Machida | .................... | G06F 7/24 |
| | | | | 340/146.2 |
| 5,855,016 A * | 12/1998 | Edem | ........................ | G06F 7/36 |
| 6,252,805 B1 * | 6/2001 | So | ........................... | G11C 29/38 |
| | | | | 365/189.07 |
| 6,330,559 B1 * | 12/2001 | Azuma | ...................... | G06F 7/36 |
| 9,268,863 B2 * | 2/2016 | Buyuktosunoglu | ......................... | |
| | | | | G06F 17/30867 |
| 9,396,143 B2 * | 7/2016 | Buyuktosunoglu | ......................... | |
| | | | | G06F 17/30867 |
| 9,424,308 B2 * | 8/2016 | Buyuktosunoglu | ......................... | |
| | | | | G06F 17/30867 |
| 9,740,659 B2 * | 8/2017 | Sreedhar | ............. | G06F 15/8015 |
| 2003/0095718 A1 * | 5/2003 | Yamazaki | ................. | G06T 5/20 |
| | | | | 382/262 |
| 2003/0123418 A1 * | 7/2003 | Buchert | .................... | G06F 7/24 |
| | | | | 370/337 |

(Continued)

OTHER PUBLICATIONS

U.S. Appl. No. 13/683,720, filed Nov. 21, 2012, Blott, M. et al., San Jose, CA USA.

(Continued)

*Primary Examiner* — Gregory B Sefcheck
*Assistant Examiner* — Suk Jin Kang
(74) *Attorney, Agent, or Firm* — John J. King

(57) ABSTRACT

A circuit for merging streams of data to generate sorted output data is described. The circuit comprises a first input coupled to receive a first data stream having a first set of N values; a second input coupled to receive a second data stream having second set of N values; a routing circuit coupled to the first input and the second input, the routing circuit enabling the routing of the first set of N values of the first data stream and the second set of N values of the second data stream; and a comparator circuit coupled to receive each value of the first set of N values and the second set of N values from the routing circuit, the comparator circuit having N comparators, wherein each comparator of the N comparators is coupled to receive a value of the first set of N values and a value of the second set of N values. A method of merging streams of data is also disclosed.

20 Claims, 10 Drawing Sheets

(56) References Cited

U.S. PATENT DOCUMENTS

| | | | |
|---|---|---|---|
| 2004/0247122 A1* | 12/2004 | Hobrock | H04L 63/0428 380/241 |
| 2005/0132242 A1* | 6/2005 | Adas | G06F 7/22 713/300 |
| 2007/0157048 A1* | 7/2007 | Levin | G06F 13/4077 713/400 |
| 2008/0208861 A1* | 8/2008 | Ray | G06F 7/36 |
| 2012/0215992 A1* | 8/2012 | Stanfill | G06F 7/22 711/154 |
| 2013/0212363 A1* | 8/2013 | Gray | G06F 9/30029 712/223 |
| 2014/0006428 A1* | 1/2014 | Kang | G06F 17/30516 707/754 |
| 2014/0337362 A1* | 11/2014 | Goldstein | G06F 17/30312 707/752 |
| 2015/0212796 A1* | 7/2015 | Stanfill | G06F 7/22 707/752 |
| 2015/0347592 A1* | 12/2015 | Buyuktosunoglu | G06F 17/30867 711/122 |
| 2016/0085702 A1* | 3/2016 | Buyuktosunoglu | G06F 17/30867 710/308 |
| 2016/0124755 A1* | 5/2016 | Balakrishnan | G06F 15/82 712/18 |
| 2016/0124900 A1* | 5/2016 | Balakrishnan | G06F 15/82 712/18 |
| 2016/0350341 A1* | 12/2016 | Goldstein | G06F 17/30312 |
| 2016/0350345 A1* | 12/2016 | Goldstein | G06F 17/30312 |

OTHER PUBLICATIONS

U.S. Appl. No. 14/100,250, filed Dec. 9, 2013, Blott, M. et al., San Jose, CA USA.

Wikipedia, "Sorting network", http://en.wikipedia.org/wiki/Sorting_network, 2014, 5 pages.

* cited by examiner

US 10,523,596 B1

CIRCUITS FOR AND METHODS OF MERGING STREAMS OF DATA TO GENERATE SORTED OUTPUT DATA

FIELD OF THE INVENTION

The present invention relates generally to integrated circuit devices, and in particular, to circuits for and methods of merging streams of data to generate sorted output data.

BACKGROUND OF THE INVENTION

Data centers deliver storage, social networking, gaming, web search and many other services coherently across diverse computing devices anywhere in the world, growing each day both in size and in the sheer diversity of provided services. Several key factors contribute to this growth, including an explosion in the volume of amorphous data now captured and exchanged. One of the fundamental challenges faced is processing and storing this ever-increasing amount of data.

Data centers that are used to store large amounts of data for various purposes are becoming important in many industries, where data centers are focused on improved operation when storing and processing an ever increasing amount of data. Many new applications relate to the processing of large amounts of data, which typically involves searching, merging and sorting. However, the complexity of the problem of storing large amounts of data increases significantly when the processing requires the sorting of different streams, where each stream carries multiple items, within fixed time constraints. Therefore, a circuit that can merge two sorted lists is important and can be fundamental to many data processing systems.

Accordingly, improved circuits and methods for merging streams of data to generate sorted output data are desired.

SUMMARY OF THE INVENTION

A circuit for merging streams of data to generate sorted output data is described. The circuit comprises a first input coupled to receive a first data stream having a first set of N values; a second input coupled to receive a second data stream having second set of N values; a routing circuit coupled to the first input and the second input, the routing circuit enabling the routing of the first set of N values of the first data stream and the second set of N values of the second data stream; and a comparator circuit coupled to receive each value of the first set of N values and the second set of N values from the routing circuit, the comparator circuit having N comparators, wherein each comparator of the N comparators is coupled to receive a value of the first set of N values and a value of the second set of N values.

A method of merging streams of data to generate sorted output data is also described. The method comprises identifying a value N for each data stream of a first data stream and a second data stream to be merged to generate the sorted output data; determining values, for each value of the first data stream and the second data stream, to couple to inputs of a comparator circuit; and providing a routing circuit which enables routing values of the first data stream and the second data stream to predetermined inputs of the comparator circuit.

Another method of merging streams of data to generate sorted output data comprises receiving a first data stream having a first set of N values at a first input; receiving a second data stream having second set of N values at a second input; and routing each value of the first set of N values of the first data stream and the second set of N values of the second data stream to a comparator circuit having N comparators; wherein each comparator of the N comparators is coupled to receive a value of the first set of N values and a value of the second set of N values.

Other features will be recognized from consideration of the Detailed Description of the Drawings and the Claims, which follow.

DETAILED DESCRIPTION OF THE DRAWINGS

Figure 1:
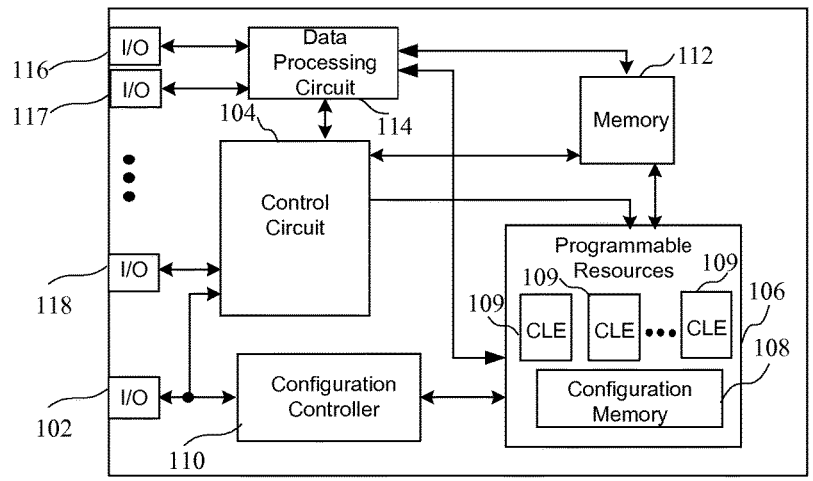
FIG. 1 is block diagram of a circuit enabling routing streams of data to generate sorted output data.

As large memory networks, such as those used in data centers, continue to become more significant and are relied upon to store greater amounts of data, the performance of memory networks is becoming more important. Many applications relate to the processing of large amounts of data, which typically involves searching, merging and sorting. Therefore, a circuit that can merge two sorted lists of data is important and can be fundamental to many data processing systems. The circuits and methods enable efficient merging of sorted data by selectively routing values of two sorted input data streams to comparators to determine which values of the input data streams to provide to the sorting network. By selectively comparing certain values of the two ordered lists, it is possible to significantly reduce the number of comparators necessary to determine which combination of values of each ordered list to apply to a sorting network. The circuits and methods set forth below scale in complexity only linear to the number of parallel words per stream and provide a realistic, high-performing implementation that can be clocked at high rates.

For example, a circuit for merging streams of data to generate sorted output data may comprise a first input coupled to receive a first data stream having a first set of N values; a second input coupled to receive a second data stream having second set of N values. A routing circuit coupled to the first input and the second input enables the routing of the first set of N values of the first data stream and the second set of N values of the second data stream to a comparator circuit. The comparator circuit may comprise N comparators, wherein each comparator of the N comparators is coupled to receive a unique value of the first set of N values a unique value of the second set of N values. That is, as will be described in more detail in reference to FIGS. 5 and 9, each value of the first set of N values and each value of the second set of N values is coupled to a different input of a comparator, and each of the 2N values of the first and second set of N values are coupled to the 2N inputs of the comparator. The results of the comparisons can be used to determine which N values of the 2N values of both data streams are provided to the sorting network.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a block diagram of integrated circuit device having CML circuits is shown. In particular, an input/output port 102 is coupled to a control circuit 104 that controls programmable resources 106 having configuration memory 108. Configuration data, described in more detail below in reference to FIGS. 13-15, may be provided to the configuration memory 108 by a configuration controller 110. The configuration data enables the operation of configurable elements 109 of the programmable resources 106. A memory 112 may be coupled to the control circuit 104 and the programmable resources 106. A data processing circuit 114 may be coupled to the control circuit 104, programmable resources 106 and the memory 112, and may receive signals external to the integrated circuit device or transmit signals by way of an I/O ports 116 and 117. The data processing circuit 114 may be used to merge sorted data streams received at the I/O ports 116 and 117, as will be described in more detail below. While the data processing circuit 114 is shown separate from the programmable resources, it should be understood that the data processing circuit could be implemented in the programmable resources 106. Other I/O ports may be coupled to circuits of the integrated circuit device, such as I/O port 118 that is coupled to the control circuit 104 as shown.

Figure 2:
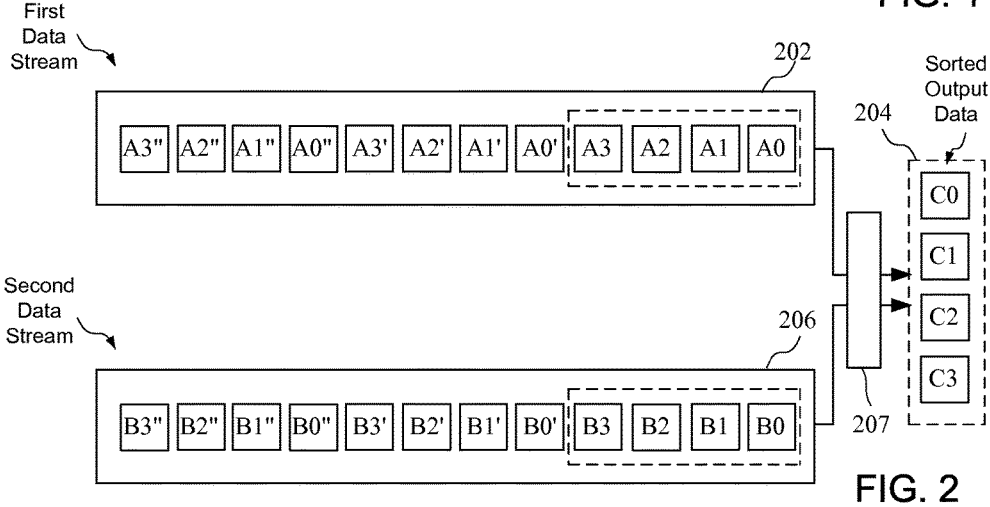
FIG. 2 is a block diagram showing sample data comprising a first data stream and a second data stream which is merged as sorted output data.

Turning now to FIG. 2, a block diagram shows sample data comprising a first data stream and a second data stream which is merged as sorted output data. The first data stream is coupled to a first shift register 202, shown here as having 4 values (in the dashed box) which may be routed to an output buffer 204 storing sorted output data C3-C0. A second data stream is coupled to a second shift register 206. A circuit 207 for merging the first data stream (i.e. stream A) and second data stream (i.e. stream B) is coupled to outputs of the first and second registers 202 and 206, where values of the data streams are merged as will be described in more detail below in reference to FIGS. 3-12. That is, elements in the individual streams A and B are sorted (i.e. where A3>A2>A1>A0 and . . . >B3>B2>B1>B0) within each stream, but not between the streams. The circuit 207 then merges the two streams. With two input streams A and B each feeding a number N of elements (A0, A1, A2, A3, . . . and B0, B1, B2, B3, . . . for a total of 2N values, where each of the values of As and Bs may be an m-bit vector), in parallel into a node that is output-bound (i.e. a node that has to output a number N of elements (C0, C1, C2, C3, . . . ) every clock cycle), the node becomes bottle-neck of the system. The circuits and methods set forth in more detail below enable optimally merging both streams into sorted output data C3, C2, C1, C0 (where C3>C2>C1>C0), and more particularly with a minimum number of comparisons of the values A3, A2, A1, A0 and B3, B2, B1, B0 to generate C3, C2, C1, C0.

As shown by way of example in FIG. 2, the sorted output data is stored in N buffers (i.e. N=4 in the example of FIG. 2), where m-bit vectors stored in the 4 buffers of the first shift register 202 or the second shift register 206, or a combination of 4 buffers of the first shift register 202 and the second shift register 206 are selected to be sorted and then stored in the 4 output buffers, as will be described in more detail below. That is, all of the values A3-A0 may be sorted and routed to the output buffer 204, all of the values B3-B0 may be sorted and routed to the output buffer 204, or a combination of values of A3-A0 and B3-B0 may be sorted and routed to the individual buffers of the output buffer 204. The determination of the values which are routed to the output buffers is made by selectively comparing predetermined values of A3-A0 with other predetermined values B3-B0, as described in more detail below. While a specific example of different values of A3-A0 and B3-B0 used to generate sorted output data C3-C0 may be referenced by way of example, it should be understood that other numbers of sorted output data may be generated, where a specific example of N=8 is also provided in FIGS. 8 and 9 to further highlight how the requirements for comparators scales linearly with the number N.

Figure 3:
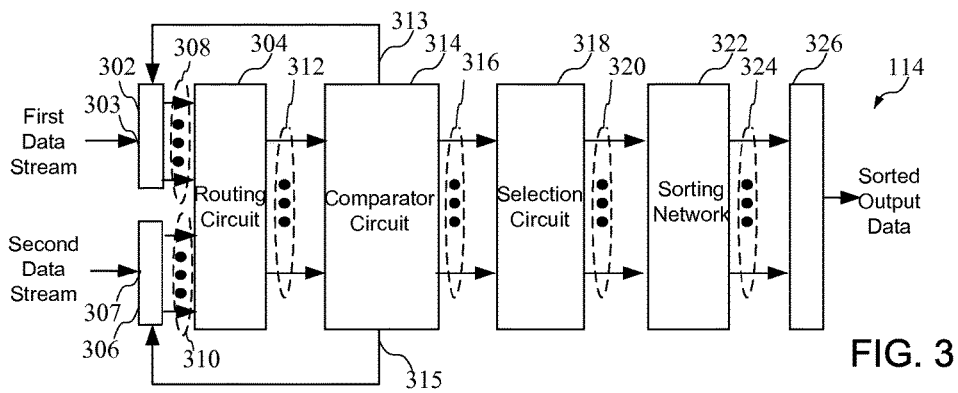
FIG. 3 is a block diagram of a circuit, such as the data processing circuit of FIG. 1, for generating sorted output data as shown in FIG. 2.

Turning now to FIG. 3, a block diagram of a circuit, such as the data processing circuit of FIG. 1, for generating sorted output data as shown in FIG. 2 is shown. In particular, a first data stream is routed to a first shift register 302 at a first input 303, where certain values of the shift register may be routed to inputs of a routing circuit 304. A second shift register 306 receiving a second data stream at an input 307 is also coupled to the routing circuit 304 to enable values of both the first data stream and the second data stream to be coupled to a comparator circuit. An output of the first shift register 302 is provided to first signal lines 308 coupled to the routing circuit 304, while an output of the second shift register 306 is provided by the second signal lines 310 coupled to the routing circuit 304. In the example of FIG. 3, the number of signal lines of each of the first signal lines 308 and the second signal lines 310 is equal to the number of buffers required to store sorted output data, or 4 signal lines for each of the first signal lines and the second signal lines and 4 buffers to generate outputs C3-C0. That is, the number of signal lines in each of the first signal lines 308 and the second signal lines 310 should be enough to enable data only from either the first data stream or the second data stream to be routed to the output buffers. As will be described in more detail below, it may be that all 4 values of A3-A0 or all 4 values B3-B0 may be stored as sorted output data C3-C0.

Signal lines 312 of the routing circuit 304 are coupled to a comparator circuit 314. A routing circuit enabling the routing of all of values A3-A0 and B3-B0 to predetermined inputs of a comparator circuit will be described in more detail in reference to FIG. 4. As described in more detail in reference to FIG. 5, the comparator circuit 314 is selectively coupled to receive certain values of the first N bits of the first data stream and the first N bits of the second data stream to enable generating the sorted output data comprising the N values C3-C0. That is, based upon the results of the comparisons performed in the comparator circuit 314 which is generated at signal lines 316, a selection circuit 318 will select generate a certain combination of values A3-A0 and B3-B0 to provide at signal lines 320 to a sorting network 322. It should be noted that the results of the comparisons by the comparator circuit 314 are provided by feedback lines 313 and 315 to the shift registers 302 and 306 and used to shift the data within the shift registers, as will be described in reference to FIG. 6. The selection circuit 318 and the sorting network 322 will be described in more detail in reference to FIG. 7 or 8. Signal lines 324 at an output of the sorting network 322 are coupled to an output register 326 which may have output buffers for storing data C3-C0. The circuit for merging data of FIG. 3 may be implemented in the data processing circuit 114 of FIG. 1, or the programmable resources 106 of FIG. 1, which will be described in more detail in reference to FIGS. 14 and 15, or a combination of the various elements of FIGS. 1, 14 and 15.

Figure 4:
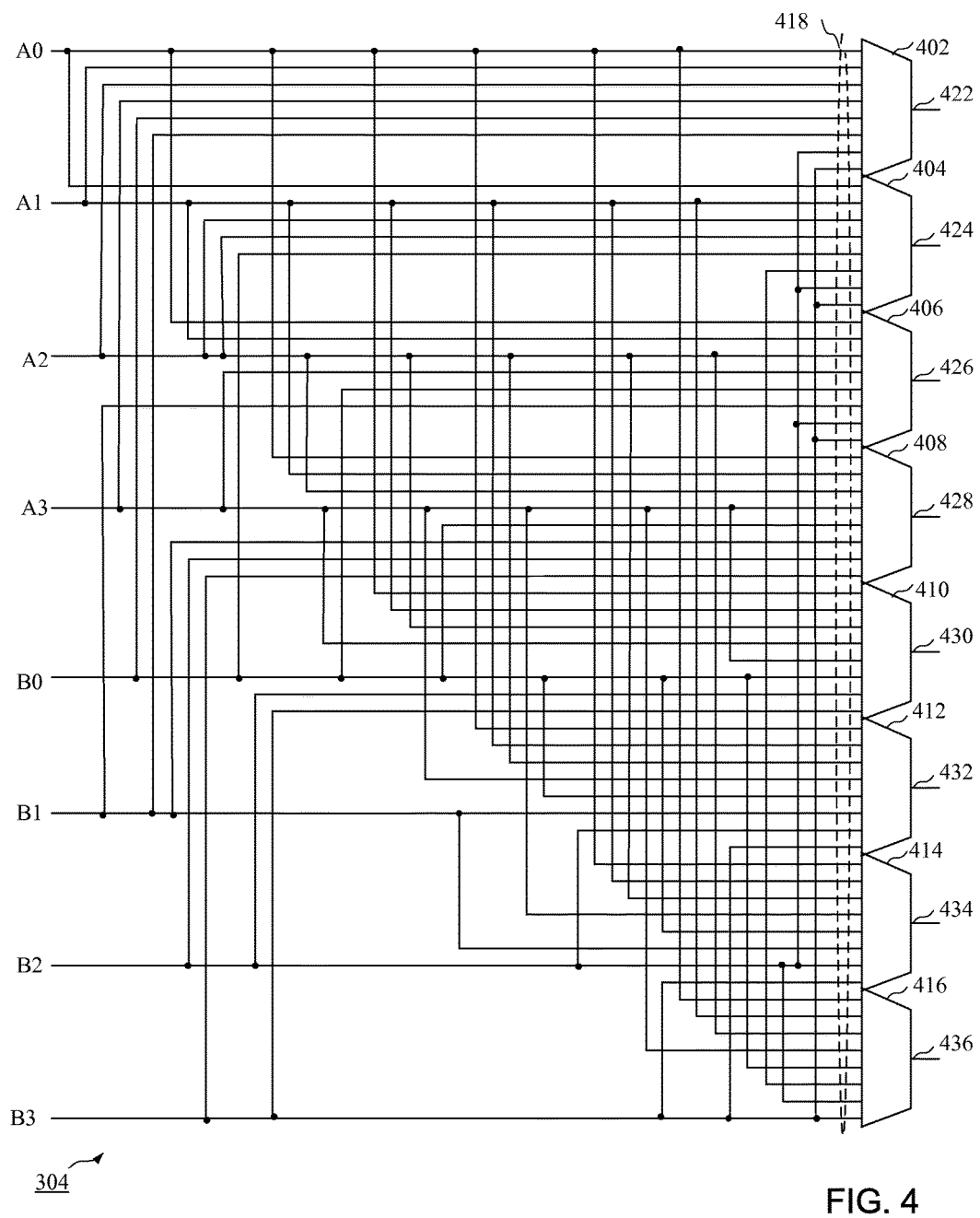
FIG. 4 is a block diagram of a routing circuit of the circuit of FIG. 3.

Turning now to FIG. 4, a block diagram of a routing circuit of FIG. 3 is shown. In particular, the routing circuit 304 shown in FIG. 4 comprises a multiplexer network having at least 2N multiplexers to enable selectively routing N inputs of each of the first and second data streams to 2N inputs of N comparators, as described in reference to FIG. 5. That is, each multiplexer 402-416 is coupled to receive each of the values A3-A0 and B3-B0 at inputs 418. Accordingly, any multiplexer can generate any of the values A3-A0 and B3-B0 at a corresponding output 422-436. As will be described in reference to FIG. 5, predetermined values of the values A3-A0 and B3-B0 are received at specific inputs of comparator circuits. The circuit of FIG. 4 is provided by way of example to enable flexibility in implementing a circuit for routing data. For example, a circuit having 8 comparators and capable of generating 8 sorted output values can be implemented to use only 4 of the comparators. Therefore, the routing circuit can be used to provide the correct input values to the comparators to implement 4 comparators. However, it should be understood that the routing circuit could comprise fixed (i.e. hard wired) connections.

Figure 5:
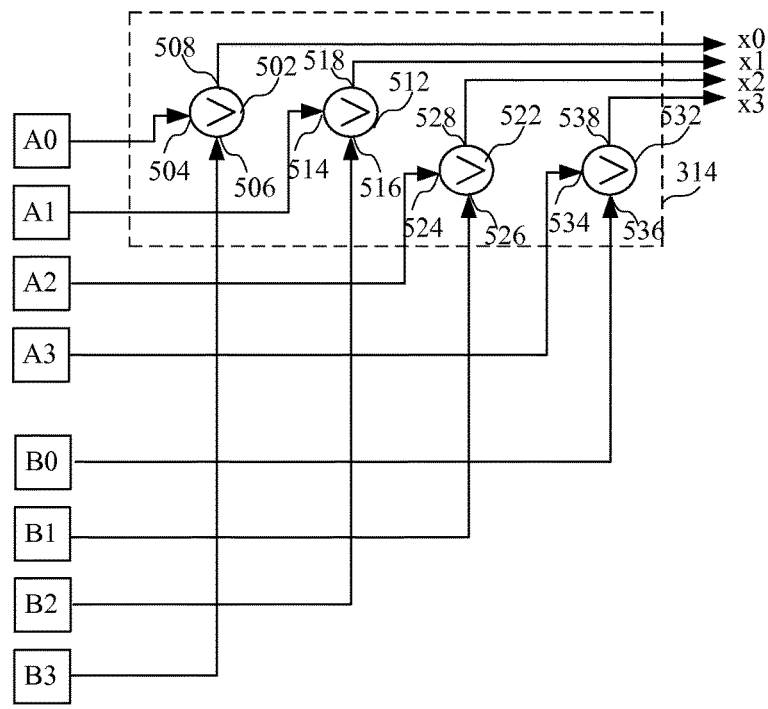
FIG. 5 is a block diagram of a comparator circuit of the circuit of FIG. 3.

Turning now to FIG. 5, a block diagram of a comparator circuit of FIG. 3 is shown. The comparator circuit 314 of FIG. 5 is configured to receive N values of each data stream (i.e. A3-A0 and B3-B0), where each input of the comparators receives a different value, to enable generating sorted output data having N values (i.e. C3-C0). Accordingly, the comparator circuit 314 comprises a first comparator 502 coupled to receive the value A0 at a first input 504 and the value B3 at a second input 506, and generate an output x0 at an output 508. A second comparator 512 coupled to receive the value A1 at a first input 514 and the value B2 at a second input 516, and generate an output x1 at an output 518. A third comparator 522 coupled to receive the value A2 at a first input 524 and value B1 at a second input 526, and generate an output x2 at an output 528. A fourth comparator 532 coupled to receive the value A3 at a first input 534 and the value B0 at a second input 536, and generate an output x3 at an output 538. The values x0-x3 are used to determine the lowest N values of the 2N values of the first and second of data A3-A0 and B3-B0 which are to be sorted by a sorting network.

The circuits and methods enable quickly determining how many elements of each stream are consumed in a clock cycle, where one can choose the appropriate elements from the stream first, then sort them to the output with a pipelined sorting-network of the output width. Considering the example where N=4, the following five cases are possible with an input of A3>A2>A1>A0 and B3>B2>B1>B0:

(1) A0>B3=>"A:B=0:4", where all of the elements of C are chosen from B (i.e. <C3,C2,C1,C0>=<B3,B2,B1,B0>=sort{B0,B1,B2,B3});

(2) B0>A3=>"A:B=4:0", where all of the elements of C are chosen from A (i.e. <C3,C2,C1,C0>=<A3,A2,A1,A0>=sort{A3,A2,A1,A0});

(3) not (1), not (2) and A1>B2=>"A:B=1:3", where A0 is smaller than B3 (because (1) is false but A0 is smaller than A1), therefore C takes 3 elements from B up to B2 and A0 (i.e. <C3,C2,C1,C0>=<A0,B2,B1,B0>=sort{B0,B1,b2,A0});

(4) not (1), not (2) and B1>A2=>"A:B=3:1", where B0 is smaller than A3 (because (2) false but B0 is smaller than B1), therefore 3 elements of A up to A2 are taken and B0 (i.e. <C3,C2,C1,C0>=<B0,A2,A1,A0>=sort{B0,A2,A1,A0}); and (5) neither (1-4)=>"A:B=2:2" i.e. <C3,C2,C1,C0>=sort{B0,B1,A1,A0}, where the lowest 2 A values and the lowest 2 B values are taken.

The cases (1)-(5) set above can also be described in terms of the results of the comparisons leading to the values of [x0, x1, x2, x3]. That is, the following combinations of A's and B's result from the following values of [x0, x1, x2, x3]:

(1) (1,*,*,*)=>0xA, 4xB;
(2) (*,1,*,*)=>4xA, 0xB;
(3) (0,0,1,*)=>1xA, 3xB;
(4) (0, 0, *, 1)=>3xA, 1xB;
(5) (0, 0, 0, 0)=>2xA, 2xB where * is a "don't care" condition and where 0xA indicates that zero A values are selected to be sorted and 4xB indicates that four B values are selected. The specific values of the A's and B's are set forth above for each of the 5 cases. As is apparent from FIG. 5, each input of comparators 502, 512, 522 and 532 receives a unique A or B value, and all of the A and B values are coupled to an input of the comparator.

Figure 6:
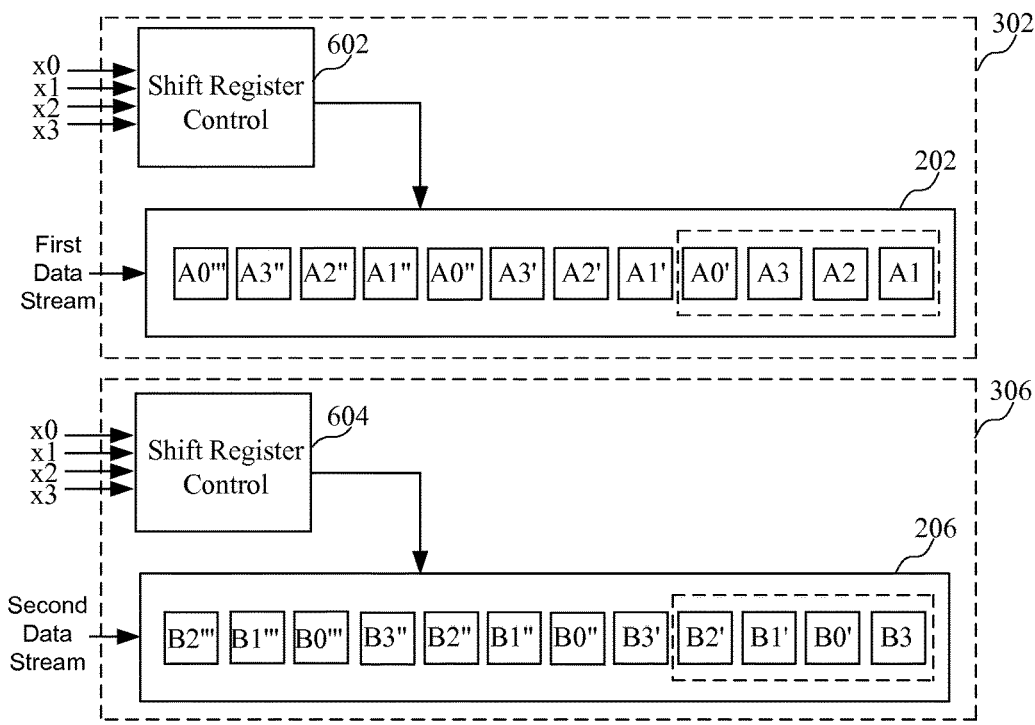
FIG. 6 is a block diagram of a circuit for implementing the shift registers of FIG. 3.

As shown in FIG. 6, each of a first shift register control circuit 602 of the shift register 302 and a shift register control circuit 604 of the shift register 306 is coupled to receive the outputs x3-x0 of the comparator circuit 314. The shift register control circuits 602 and 604 shift the values in the corresponding shift registers 202 and 206 based upon the outputs x3-x0, which indicates how many A and B values, respectively, are shifted. In the event of case (3) when (x3, x2, x1, x0) is (0, 0, 1, *), there are one A values and three B values in the outputs C3-C1. Therefore, the As are shifted by one, and the Bs are shifted by three, as shown in FIG. 6 by way of example. That is, A1 is now in the first slot of the shift register 202 and B3 is now in the first slot of shift register 206.

Figure 7:
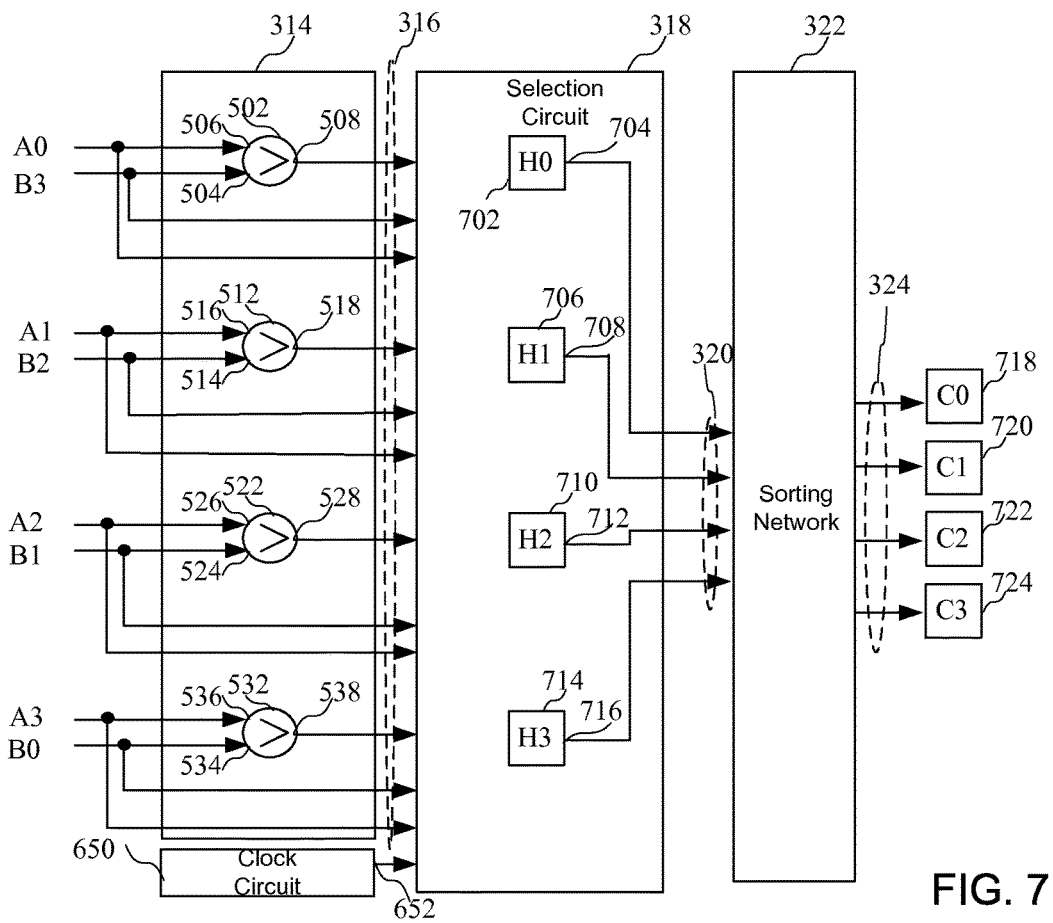
FIG. 7 is a block diagram showing an example of a circuit for merging streams of data receiving 4 inputs from each stream.

As shown in FIG. 7, the selection circuit comprises 4 buffers having outputs which are coupled to corresponding inputs to a sorting network. In particular, a first buffer 702 receives a value from the A3, A2, A1, A0 and B3, B2, B1, B0 which is stored as H0 and generated at an output 704 coupled to the sorting network 322 by way of the signal lines 320. A second buffer 706 receives another unique value from the A3, A2, A1, A0 and B3, B2, B1, B0 which is stored as H1 and generated at an output 708 coupled to the sorting network 322 by way of the signal lines 320. A third buffer 710 receives a third unique value from the A3, A2, A1, A0 and B3, B2, B1, B0 which is stored as H2 and generated at an output 712 coupled to the sorting network 322 by way of the signal lines 320. A fourth buffer 714 receives a fourth unique value from the A3, A2, A1, A0 and B3, B2, B1, B0 which is stored as H3 and generated at an output 716 coupled to the sorting network 322 by way of the signal lines 320. It should be noted that values that are stored as H3, H2, H1, and H0 are not the results of the comparisons performed in comparator circuit 314, but rather the values of the different combinations in the equations (1)-(5) above. That is, the result of the comparisons determine which values of the pairs of inputs to the comparators are selected, where only one input to a comparator is selected, and the outputs of the sorting network are stored in registers 718-724.

Further, by considering these 5 possible cases above, it can be seen that there are only 2 possible inputs to the comparators to determine the values for [x0, x1, x2, x3]. For example, considering the 5 possible cases indicating values (which are yet to be sorted), the values to be sorted can be re-ordered such that only two different values are in any column as shown:

(1) sort{B0,B1,B2,B3}
(2) sort{A3,A2,A1,A0}
(3) sort{B0,B1,B2,A0}
(4) sort{B0,A2,A1,A0}
(5) sort{B0,B1,A1,A0}
={H3,H2,H1,H0}.

Looking at the columns, H3 is B0 or A3; H2 is B1 or A2; H1 is B2 or A1; and H0 is A0 or B3, where the actual values of H3, H2, H1, and H0 are determined by the comparison results as described above in the cases (1)-(5).

It should be noted that by making the particular comparisons shown in FIG. 5, only 4 comparators are required to determine which 4 values of a possible 8 values (i.e. 4 from each input data stream) are routed to a sorting network. That is, each input to the sorting network is chosen from only two elements, one from each stream. All comparisons can be computed in parallel, as there are no dependencies among them. The subsequent sort can be parallelized through use of a sorting network because it gets exactly those N elements that will go to the output. All other elements remain stalled on the stream. That is, they remain in shift registers 202 and 206 at each input to the node, filled by streams in blocks of a size N, but offering only the latest N elements to be chosen by the above cases. For example, considering case 3 where the values for sorting are sort{B0, B1, B2, A0}, only the first value A0 of the shift register is moved out, where A0', A3, A2, and A1 would shift into the dashed box of the first shift register 202 after A0 is shifted out, but three values (i.e. B2', B1' and B0') would shift into the dashed box in the second shift register 206 with the remaining value B3 after B2, B1, and B0 are shifted out.

The circuits and methods are scalable with N, as there are only (N+1) different possibilities to take numbers of elements from two streams, each offering N elements at a time. An example will be provided below, where N=8, and only N+1=9 different possibilities. While a conventional approach requires N*N comparisons, the circuit set forth in FIG. 5 requires only N comparators. Therefore, the complexity of logic is linear in N and allows for clocking at high rates. The input FIFO buffers scale similarly. Furthermore, the number of possible inputs to each channel of the subsequent sorting network is reduced to 2, rather than a range of (N+1) to (2*N) in a conventional circuit. While the implementation of the circuits and methods are shown on an FPGA, it should be understood that the circuits and methods are not bound to clocked streams on FPGAs, but generally operates on streams transporting elements in parallel and that can be stalled before a bottleneck in any type of integrated circuit.

Figure 8:
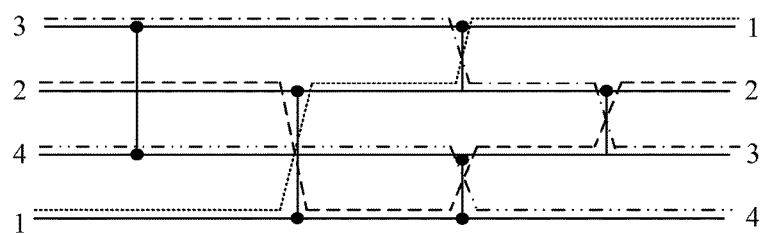
FIG. 8 is a diagram showing the operation of a sorting network.

Turning now to FIG. 8, a diagram shows the operation of a sorting network. As shown in FIG. 8, comparators (shown by the vertical lines between the horizontal data path lines) compare the current values on the horizontal lines (connected by the vertical lines) to determine whether to swap the values such that, at the end of the comparison operation of all of the comparators, the input values will be sorted in numeric order as shown. Sorting networks are commonly implemented, and one skilled in the art could implement a circuit to achieve the sorting network as shown in FIG. 8.

Figure 9:
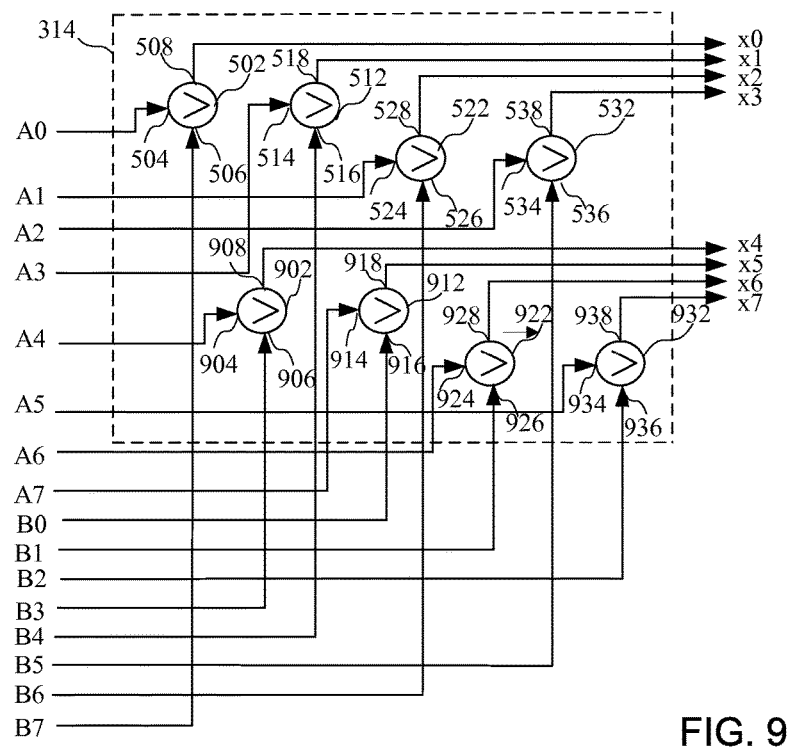
FIG. 9 is a block diagram of a comparator circuit for enabling merging streams of data having 8 inputs.
Figure 10:
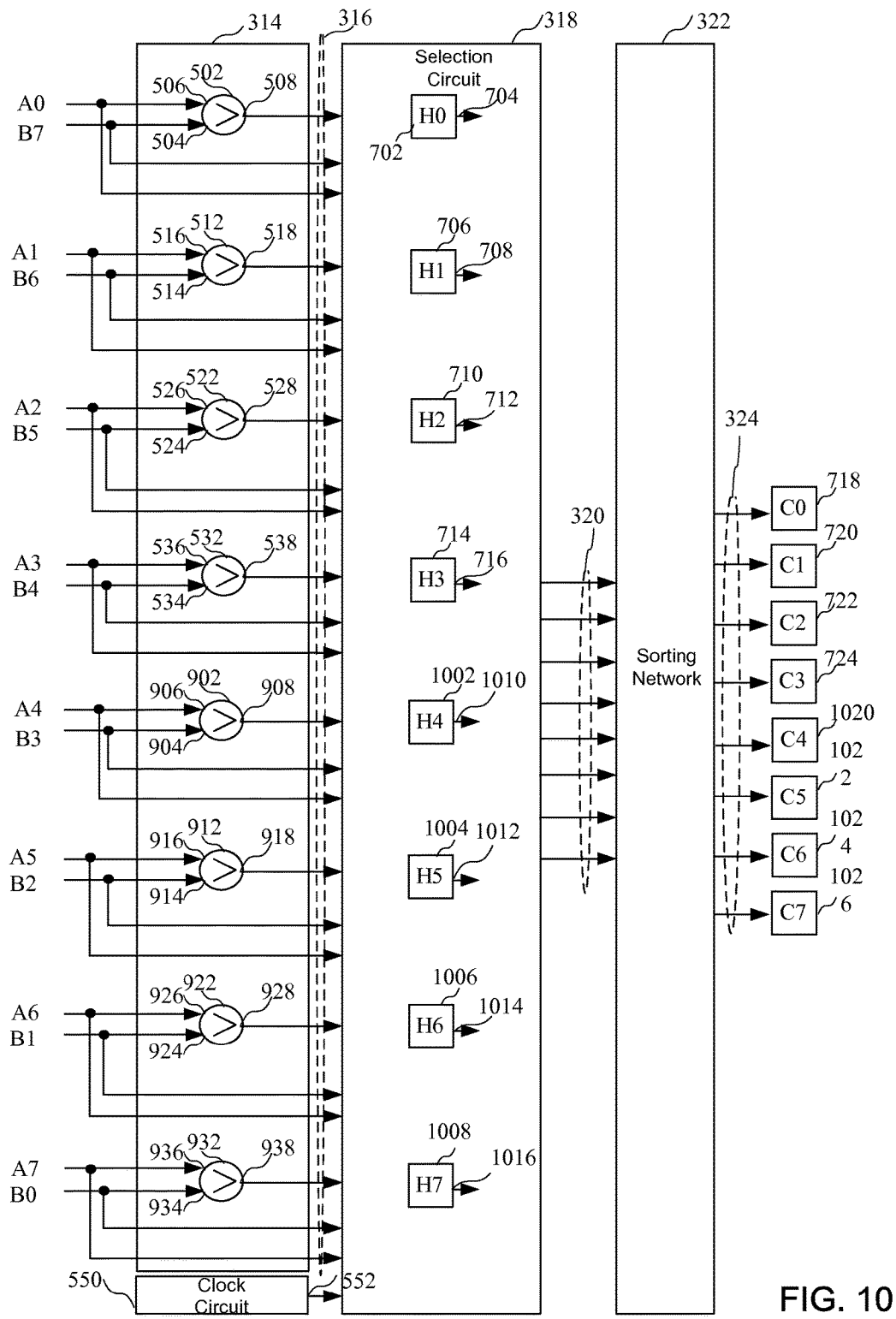
FIG. 10 is a block diagram showing an example of a circuit for merging streams of data and receiving 8 inputs from each stream.

Turning now to FIGS. 9 and 10, circuits enabling the merging streams of data having 8 values generated as sorted outputs (based upon 8 values from each of two data streams) is shown. More particularly, FIGS. 9 and 10 are provided to show how the requirement for comparators is linear, and that the determination of unique values which are provided to the 8 comparators can easily be determined in a similar way as described above in reference to FIGS. 5 and 6. That is, the comparator circuit 314 further comprises a fourth comparator 902 coupled to receive an A value at a first input 904 and a B value at a second input 906, and generate an output x4 at an output 908. A sixth comparator 812 coupled to receive an A value at a first input 914 and a B value at a second input 916, and generate an output x5 at an output 918. A seventh comparator 922 coupled to receive an A value at a first input 924 and a B value at a second input 926, and generate an output x6 at an output 928. An eight comparator 932 coupled to receive an A value at a first input 934 and a B value at a second input 936, and generate an output x7 at an output 938. As shown in FIG. 10, additional registers 1002-1008 store selected values of the inputs A7-A0 and B7-B0 which are generated at corresponding outputs 1010-1016 to enable generating values C7-C0 at the output of the sorting network.

In considering cases where N=8, there are now 9 cases:
(1) A:B=0:8
(2) A:B=8:0
(3) A:B=1:7
(4) A:B=7:1
(5) A:B=2:6
(6) A:B=6:2
(7) A:B=3:5
(8) A:B=5:3
(9) A:B=4:4
where,
for case 1)<C7:C0>=<B7:B0>;
for case 2)<C7:C0>=<A7:A0>;
for case 3)<C7:C0>=<A0,B6:B0>;
for case 4)<C7:C0>=<B0,A6:A0>;
for case 5)<C7:C0>=<A1:A0,B5:B0>;
for case 6)<C7:C0>=<B1:B0,A5:A0>;
for case 7)<C7:c0>=<A2:A0,B4:B0>;
for case 8)<C7:C0>=<B2:B0,A4:A0>; and
for case 9)<C7:C0>=<B3:B0,A3:A0>.

It is first necessary to check for case 1, where the comparison of A0>B7 will determine whether case 1 exists. Then, it is necessary to check for case 2, where the comparison of B0>a7 will determine whether case 2 exists. Cases 1 and 2 are similar to cases 1 and 2, where either all of the A's or all of the B's are provided to the comparator.

Then, for cases 3-8, it is necessary to determine how far the A's overlap with the B's. Therefore, it is necessary to check A1>B6. If none of the above are true, and A1>B6, then <C7:C0> is <A0, B6:B0>. Similarly for case 4, it is necessary to check the inverse: B1>A6. Therefore, for case 4: if none of the above and B1>A6, the <C7:C0> is <B0, A6:A0>. As can be seen by this pattern, the 9 cases will result in various sort values. The sort values are then reordered such that, when aligned horizontally, any vertical column will only have two unique values, where the two unique values of each of the sets A7-A0 and B7-B0 are routed to the 8 comparators, as shown in FIGS. 9 and 10.

Figure 11:
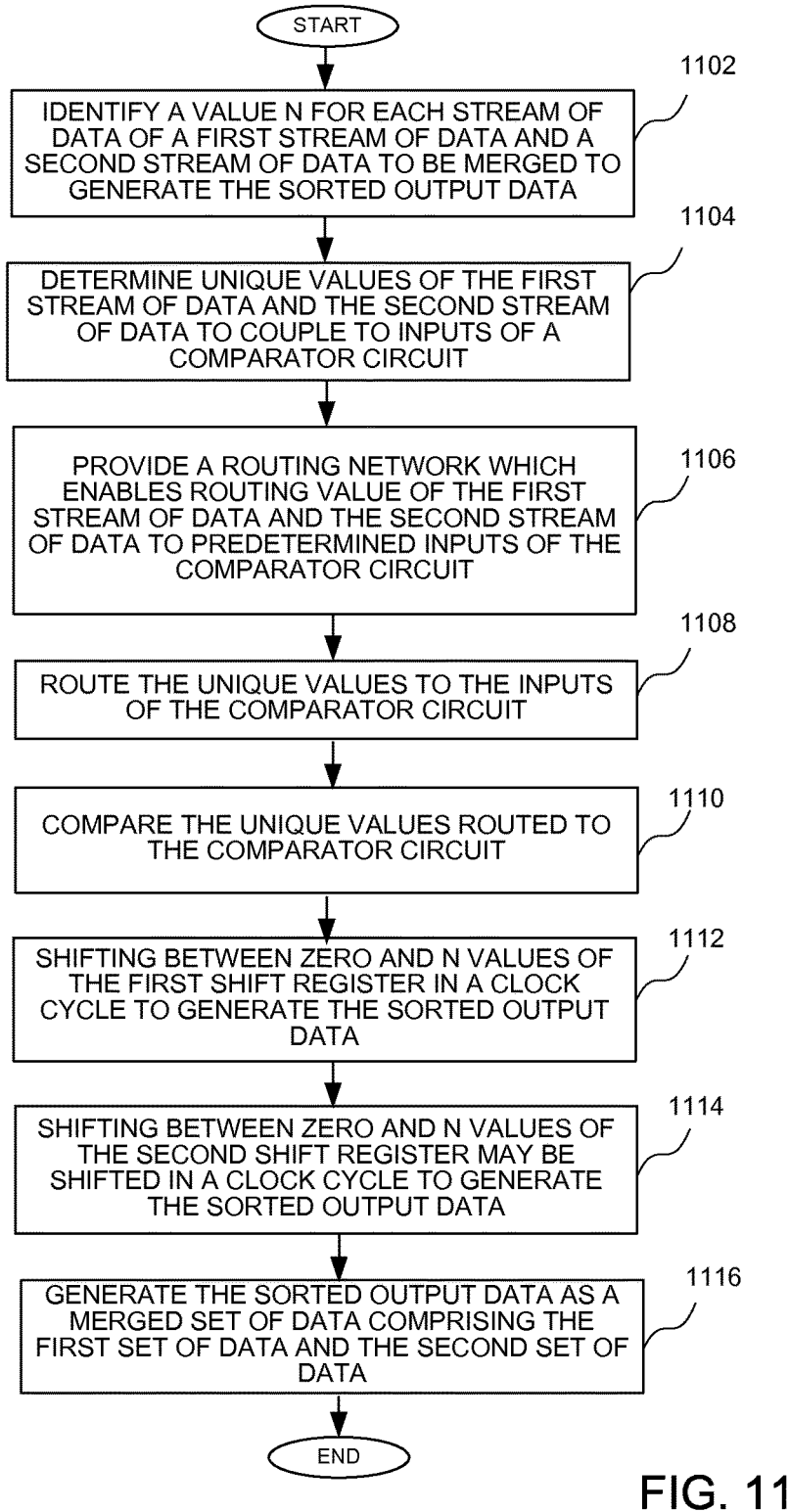
FIG. 11 is a flow chart showing a method of merging streams of data.

Turning now to FIG. 11, a flow chart shows a method of merging streams of data. In particular, a value N is identified for each stream of data of a first data stream and a second data stream to be merged to generate the sorted output data at a block 1102. Unique values of the first data stream and the second data stream to couple to inputs of a comparator circuit are determined at a block 1104. Determining unique values may involve comparing predetermined values of the first data stream and the second data stream to determine which values of the first data steam and the second data stream to route to the comparator circuit, for example. A routing circuit is provided which enables routing inputs coupled to receive the first data stream and the second data stream to predetermined inputs of the comparator circuit at a block 1106. The unique values are routed to the inputs of the comparator circuit at a block 1108. The unique values routed to the comparator circuit are compared at a block 1110. Between zero and N values of the first shift register are shifted in a clock cycle to generate the sorted output data at a block 1112, and between zero and N values of the second shift register are shifted in the clock cycle to generate the sorted output data at a block 1114. The sorted output data are generated as a merged set of data comprising the first set of data and the second set of data at a block 1116.

Figure 12:
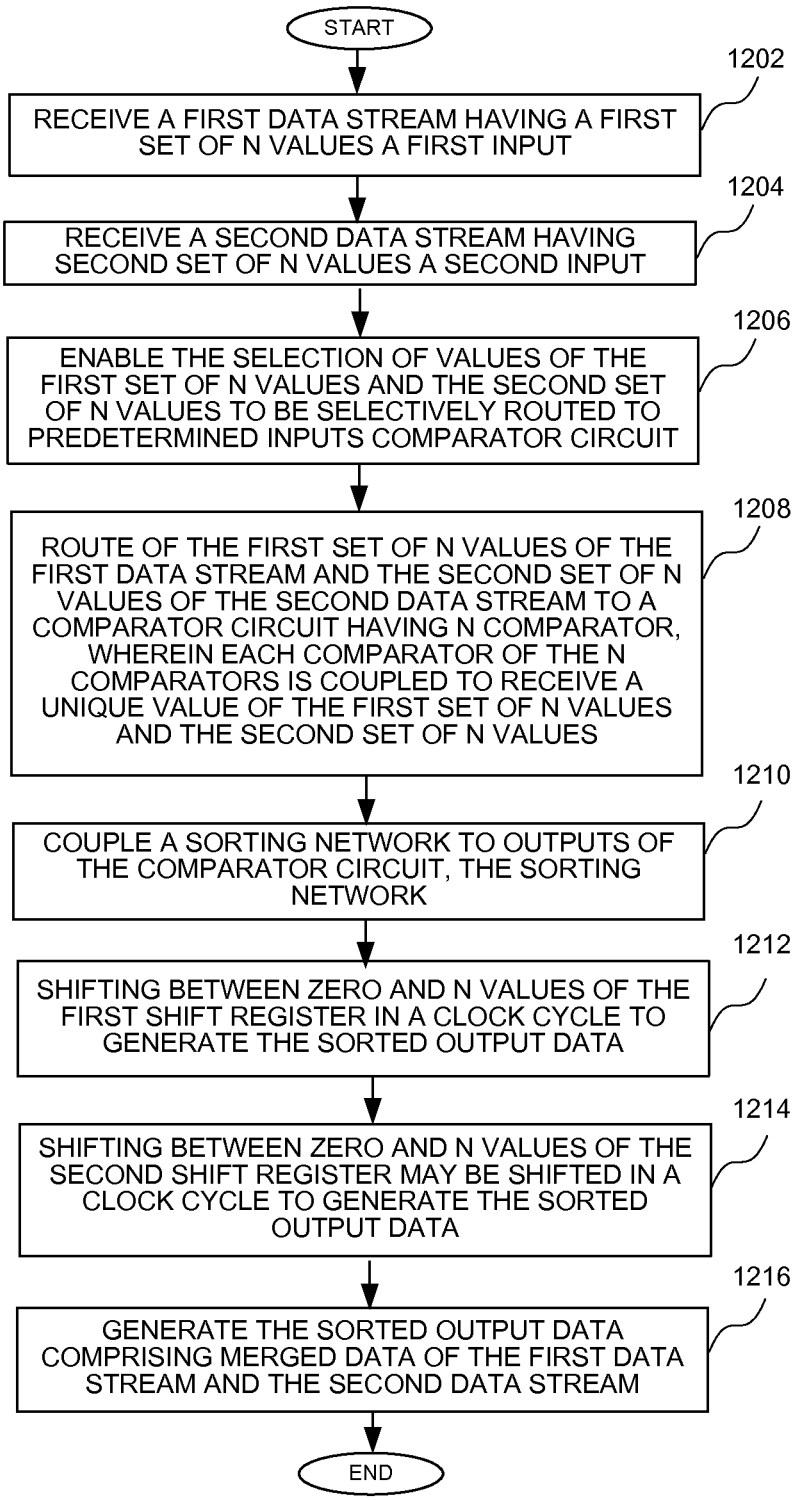
FIG. 12 is a flow chart showing another method of merging streams of data.

Turning now to FIG. 12, a flow chart shows another method of merging streams of data. A first data stream having a first set of N values is received at a first input at a block 1202. A second data stream having second set of N values is received at a second input at a block 1204. The selection of values of the first set of N values and the second set of N values is enabled to be selectively routed to predetermined inputs comparator circuit at a block 1206. The first set of N values of the first data stream and the second set of N values of the second data stream are routed to a comparator circuit having N comparators at a block 1208, wherein each comparator of the N comparators is coupled to receive a unique value of the first set of N values and the second set of N values. A sorting network is coupled to outputs of the comparator circuit at a block 1210. Between zero and N values of the first shift register are shifted in a clock cycle to generate the sorted output data at a block 1212, and between zero and N values of the second shift register are shifted in the clock cycle to generate the sorted output data at a block 1214. The sorted output data comprising merged data of the first data stream and the second data stream is generated at a block 1216.

The various elements of the methods of FIGS. 11 and 12 may be implemented using the circuits of FIGS. 1-10 and 13-15 as described, or using some other suitable circuits.

While specific elements of the method are described, it should be understood that additional elements of the method, or additional details related to the elements, could be implemented according to the disclosure of FIGS. 1-10 and 13-15.

Figure 13:
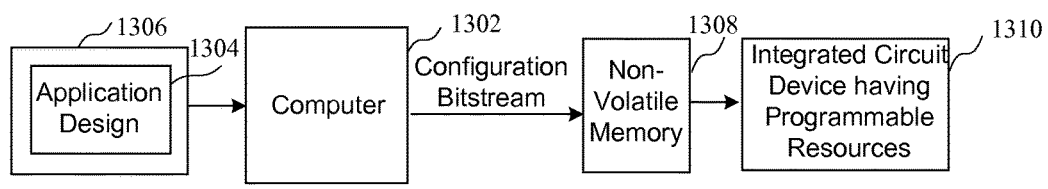
FIG. 13 is a block diagram of a system for programming a device having programmable resources.

Turning now to FIG. 13, a block diagram of a system for programming a device having programmable resources according to an embodiment is shown. In particular, a computer 1302 is coupled to receive a circuit design 1304 from a memory 1306, and generates a configuration bitstream that is stored in the non-volatile memory 1306. As will be described in more detail below, the circuit design may be a high level design, such as a circuit design defined in a hardware description language (HDL). Also, the computer may be configured to run software that generates a configuration bitstream that is stored in the non-volatile memory 1308 and provided to an integrated circuit 1310 that may be a programmable integrated circuit, such as the integrated circuit described below in FIG. 14. As will be described in more detail below, bit of the configuration bitstream are used to configure programmable resources of the integrated circuit.

Figure 14:
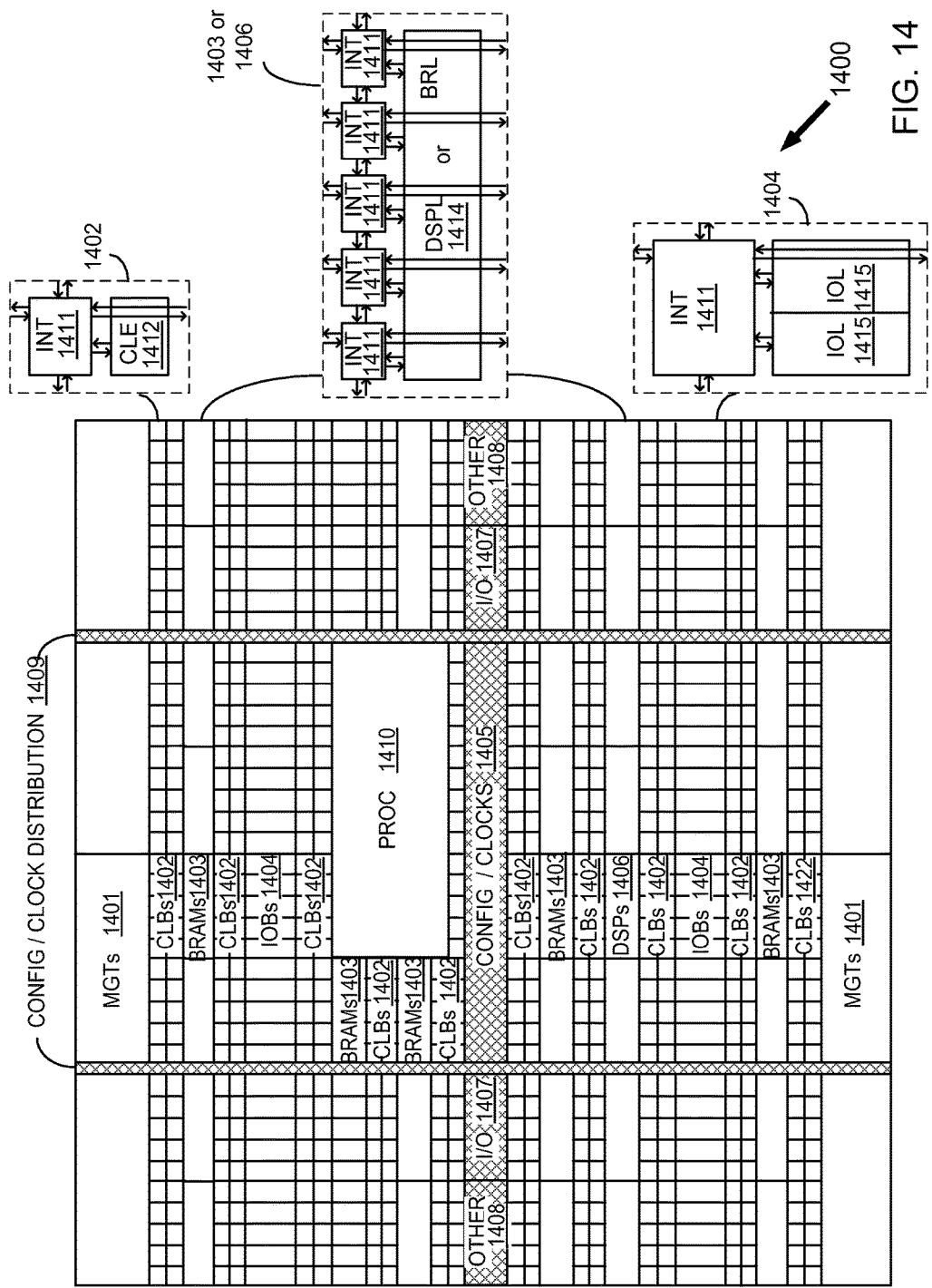
FIG. 14 is a block diagram of a device having programmable resources.

Turning now to FIG. 14, a block diagram of a device having programmable resources including the circuits of FIGS. 1-10 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 14 comprises an FPGA architecture 1400 having a large number of different programmable tiles including multi-gigabit transceivers (MGTs) 1401, CLBs 1402, random access memory blocks (BRAMs) 1403, input/output blocks (IOBs) 1404, configuration and clocking logic (CONFIG/CLOCKS) 1405, digital signal processing blocks (DSPs) 1406, specialized input/output blocks (I/O) 1407 (e.g., configuration ports and clock ports), and other programmable logic 1408 such as digital clock managers, analog-to-digital converters, system monitoring logic, and so forth. Some FPGAs also include dedicated processor blocks (PROC) 1410, which may be used to implement a software application, for example.

In some FPGAs, each programmable tile includes a programmable interconnect element (INT) 1411 having standardized connections to and from a corresponding interconnect element in each adjacent tile. Therefore, the programmable interconnect elements taken together implement the programmable interconnect structure for the illustrated FPGA. The programmable interconnect element 1411 also includes the connections to and from the programmable logic element within the same tile, as shown by the examples included at the top of FIG. 14.

For example, a CLB 1402 may include a configurable logic element (CLE) 1412 that may be programmed to implement user logic plus a single programmable interconnect element 1411. A BRAM 1403 may include a BRAM logic element (BRL) 1413 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 1406 may include a DSP logic element (DSPL) 1414 in addition to an appropriate number of programmable interconnect elements. An IOB 1404 may include, for example, two instances of an input/output logic element (IOL) 1415 in addition to one instance of the programmable interconnect element 1411. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 1409 extending from this column are used to distribute the clocks and configuration signals across the breadth of the FPGA. Some FPGAs utilizing the architecture illustrated in FIG. 14 include additional logic blocks that disrupt the regular columnar structure making up a large part of the FPGA. The additional logic blocks may be programmable blocks and/or dedicated logic. For example, the processor block PROC 1410 shown in FIG. 14 spans several columns of CLBs and BRAMs.

Note that FIG. 14 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 14 are purely exemplary. For example, in an actual FPGA more than one adjacent column of CLBs is typically included wherever the CLBs appear in order to facilitate the efficient implementation of user logic. While the embodiment of FIG. 14 relates to an integrated circuit having programmable resources, it should be understood that the circuits and methods set forth in more detail below could be implemented in any type of ASIC.

Figure 15:
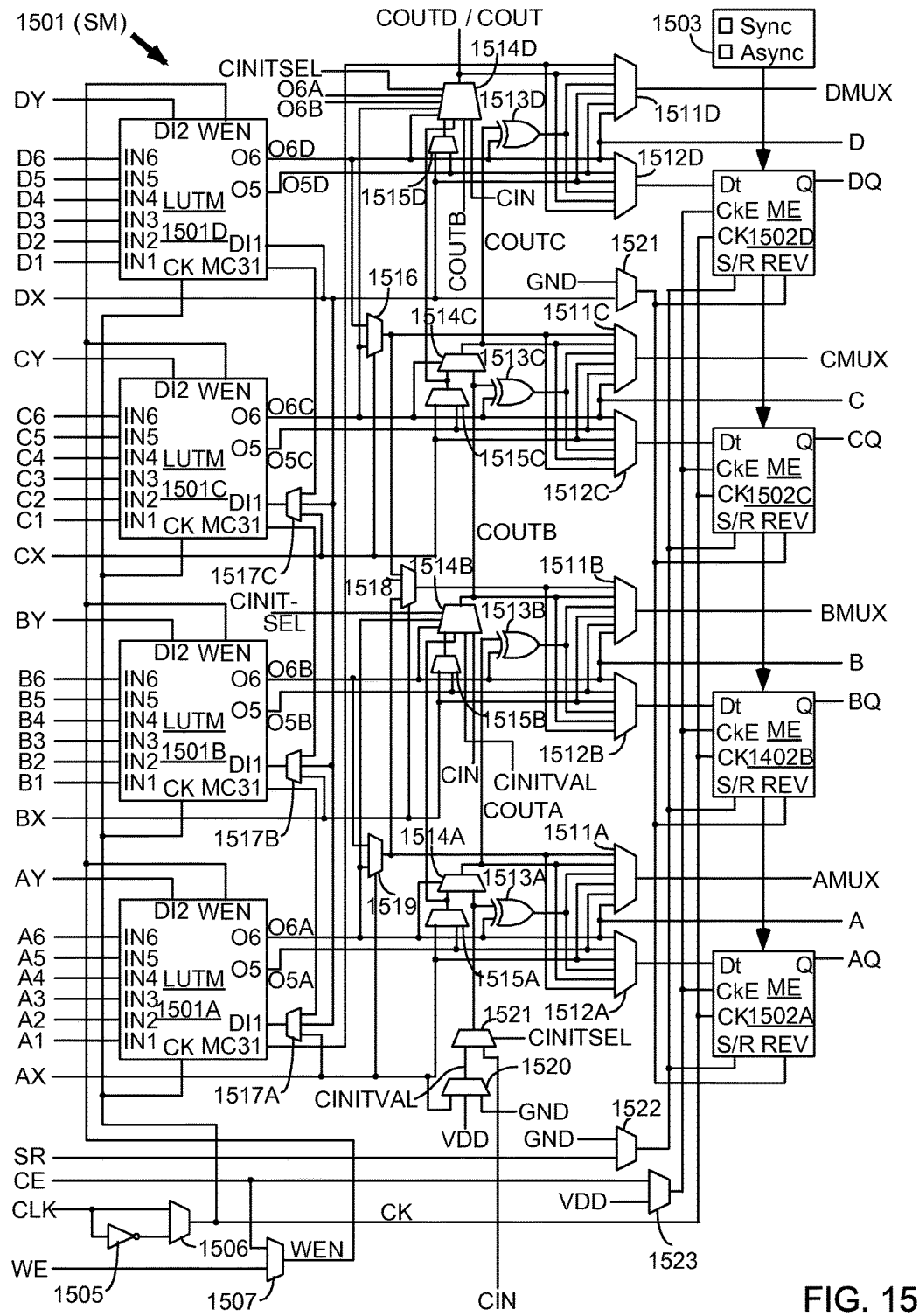
FIG. 15 is a block diagram of a configurable logic element of the device of FIG. 14.

Turning now to FIG. 15, block diagram of a configurable logic element of the device of FIG. 14 is shown. In particular, FIG. 15 illustrates in simplified form a configurable logic element of a configuration logic block 1402 of FIG. 14. In the embodiment of FIG. 15, slice M 1501 includes four lookup tables (LUTMs) 1501A-1501D, each driven by six LUT data input terminals A1-A6, B1-B6, C1-C6, and D1-D6 and each providing two LUT output signals O5 and O6. The O6 output terminals from LUTs 1501A-1501D drive slice output terminals A-D, respectively. The LUT data input signals are supplied by the FPGA interconnect structure via input multiplexers, which may be implemented by programmable interconnect element 1511, and the LUT output signals are also supplied to the interconnect structure. Slice M also includes: output select multiplexers 1511A-1511D driving output terminals AMUX-DMUX; multiplexers 1512A-1512D driving the data input terminals of memory elements 1502A-1502D; combinational multiplexers 1516, 1518, and 1519; bounce multiplexer circuits 1522-1523; a circuit represented by inverter 1505 and multiplexer 1506 (which together provide an optional inversion on the input clock path); and carry logic having multiplexers 1514A-1514D, 1515A-1515D, 1520-1521 and exclusive OR gates 1513A-1513D. All of these elements are coupled together as shown in FIG. 15. Where select inputs are not shown for the multiplexers illustrated in FIG. 15, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 15 for clarity, as well as from other selected figures herein.

In the pictured embodiment, each memory element 1502A-1502D may be programmed to function as a synchronous or asynchronous flip-flop or latch. The selection between synchronous and asynchronous functionality is made for all four memory elements in a slice by programming Sync/Asynch selection circuit 1503. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1502A-1502D are clocked by a clock signal CK, which may be provided by a global clock network or by the interconnect structure, for example. Such programmable memory elements are well known in the art of FPGA design. Each memory element 1502A-1502D provides a registered output signal AQ-DQ to the interconnect structure. Because each LUT 1501A-1501D provides two output signals, O5 and O6, the LUT may be configured to function as two 5-input LUTs with five shared input signals (IN1-IN5), or as one 6-input LUT having input signals IN1-IN6.

In the embodiment of FIG. 15, each LUTM 1501A-1501D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1517A-1517C for LUTs 1501A-1501C), or to the two 32-bit RAMs via input terminals DI1 and DI2. RAM write operations in the LUT RAMs are controlled by clock signal CK from multiplexer 1506 and by write enable signal WEN from multiplexer 1507, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1501A may also be provided to the general interconnect structure for shift register chaining, via output select multiplexer 1511D and CLE output terminal DMUX. Accordingly, the circuits and methods set forth above may be implemented in a device such as the devices of FIGS. 14 and 15, or any other suitable device.

It can therefore be appreciated that new circuits for and methods of merging streams of data has been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A circuit for merging streams of data to generate sorted output data, the circuit comprising:
    a first input coupled to receive a first data stream having a first ordered set of N values sorted in numeric order, where N is an integer value greater than one;
    a second input coupled to receive a second data stream having a second ordered set of N values sorted in numeric order;
    a routing circuit coupled to the first input and the second input, the routing circuit enabling the routing of the first ordered set of N values of the first data stream and the second ordered set of N values of the second data stream; and
    a comparator circuit coupled to receive each value of the first ordered set of N values and the second ordered set of N values from the routing circuit, the comparator circuit having N comparators, wherein each comparator of the N comparators is coupled to receive a predetermined value of the first ordered set of N values and a predetermined value of the second ordered set of N values: and
    wherein, for each comparator of the N comparators, one of the predetermined value of the first ordered set of N values and the predetermined value of the second ordered set of N values is selected to be sorted as sorted output data.

2. The circuit of claim 1 further comprising a sorting network coupled to outputs of the comparator circuit, the sorting network generating the sorted output data comprising merged data of the first data stream and the second data stream.

3. The circuit of claim 2 wherein the first input comprises an input of a first shift register, and between zero and N values of the first shift register are shifted in a clock cycle to generate the sorted output data.

4. The circuit of claim 3 wherein the second input comprises an input of a second shift register, and between zero and N values of the second shift register are shifted in a clock cycle to generate the sorted output data.

5. The circuit of claim 1 wherein the routing circuit selectively routes values of the first ordered set of N values and the second ordered set of N values to predetermined inputs of the comparator circuit.

6. The circuit of claim 5 further comprising a selection circuit enabling, for each comparator, the selection of a value of the first ordered set of N values and the second ordered set of N values to be routed to a sorting network.

7. The circuit of claim 1 wherein each value of the first ordered set of N values and the second ordered set of N values comprises an m-bit vector, where m is an integer value greater than one.

8. A method of merging streams of data to generate sorted output data, the method comprising:
    identifying a value N for each data stream of a first data stream and a second data stream to be merged to generate the sorted output data, where N is an integer value greater than one;
    determining values, for a first ordered set of values sorted in numeric order of the first data stream and a second ordered set of values sorted in numeric order of the second data stream, to couple to inputs of a plurality of comparators of a comparator circuit;
    providing a routing circuit which enables routing predetermined values of the first ordered set of values of the first data stream and the second ordered set of values of the second data stream to predetermined inputs of the comparator circuit: and
    selecting, for each comparator, one of the predetermined value of the first ordered set of values and the predetermined value of the second ordered set of values to be sorted as sorted output data.

9. The method of claim 8 further comprising comparing the predetermined values of the first data stream and the second data stream to determine which values of the first data steam and the second data stream to send to a sorting network.

10. The method of claim 9 further comprising sorting the predetermined values of the first ordered set of values the first data stream and the second ordered set of values the second data stream.

11. The method of claim 10 further comprising shifting values of the first data stream and the second data stream based upon a determination of which values of the first data steam and the second data stream are sent to the sorting network.

12. The method of claim 11 wherein shifting values comprises shifting between zero and N values of a first shift register in a clock cycle to generate the sorted output data.

13. The method of claim 12 wherein shifting values comprises shifting between zero and N values of a second shift register in a clock cycle to generate the sorted output data.

14. The method of claim 13 wherein generating the sorted output data comprises generating a merged set of data comprising values of the first data stream and values of the second data stream.

15. A method of merging streams of data to generate sorted output data, the method comprising:
    receiving a first data stream having a first ordered set of N values sorted in numeric order at a first input, where N is an integer value greater than one;
    receiving a second data stream having a second ordered set of N values sorted in numeric order at a second input; and
    routing each value of the first ordered set of N values of the first data stream and the second ordered set of N values of the second data stream to a comparator circuit having N comparators;
    wherein each comparator of the N comparators is coupled to receive a predetermined value of the first ordered set of N values and a predetermined value of the second ordered set of N values: and
    wherein, for each comparator of the N comparators, one of the predetermined value of the first ordered set of N values and the predetermined value of the second ordered set of N values is selected to be sorted as sorted output data.

16. The method of claim 15 further comprising coupling a sorting network to outputs of the comparator circuit, the sorting network generating the sorted output data comprising merged data of values of the first data stream and values of the second data stream.

17. The method of claim 16 further comprising shifting between zero and N values of a first shift register in a clock cycle to generate the sorted output data.

18. The method of claim 17 further comprising shifting between zero and N values of a second shift register in a clock cycle to generate the sorted output data.

19. The method of claim 15 further comprising enabling, for each comparator, the selection of a value of the first ordered set of N values and the second ordered set of N values to be selectively routed to predetermined inputs of the N comparators of the comparator circuit.

20. The method of claim 19 further comprising selectively routing values of the first ordered set of N values and the second ordered set of N values to a sorting network.

\* \* \* \* \*